United States Patent [19]

Billet et al.

[11] Patent Number: 4,698,045
[45] Date of Patent: Oct. 6, 1987

[54] TORSIONAL DAMPER WITH INTERMEDIATE MEMBER FOR RENDERING SPRINGS INOPERATIVE AT LOW TORQUE

[75] Inventors: René Billet, Lamorlaye; Paolo Rumignani, Neuilly S/Seine; Gustave Chasseguet, Taverny, all of France

[73] Assignee: Valeo, Paris, France

[21] Appl. No.: 746,637

[22] Filed: Jun. 20, 1985

[30] Foreign Application Priority Data

Jun. 22, 1984 [FR] France .................. 84 09853
May 31, 1985 [FR] France .................. 85 08253

[51] Int. Cl.⁴ .............. F16D 13/68; F16F 15/12
[52] U.S. Cl. ............... 464/68; 192/105 BA; 192/106.2; 464/64
[58] Field of Search ........ 192/103 B, 105 BA, 106.2; 464/64, 66, 67, 68

[56] References Cited

U.S. PATENT DOCUMENTS

| | | | |
|---|---|---|---|
| 2,762,483 | 9/1956 | Clark ................. | 192/105 BA |
| 4,285,423 | 8/1981 | Fadler et al. ........ | 192/106.2 |
| 4,376,477 | 3/1983 | Loizeau .............. | 192/106.2 |
| 4,396,103 | 8/1983 | Loizeau .............. | 192/106.2 |
| 4,412,606 | 11/1983 | Loizeau .............. | 192/106.2 |
| 4,433,770 | 2/1984 | Loizeau et al. ...... | 464/68 X |
| 4,440,283 | 4/1984 | Nioloux .............. | 464/68 X |
| 4,474,277 | 10/1984 | Loizeau .............. | 192/106.2 |

FOREIGN PATENT DOCUMENTS

| | | |
|---|---|---|
| 0079727 | 5/1983 | European Pat. Off. . |
| 0104823 | 4/1984 | European Pat. Off. . |
| 2447015 | 4/1976 | Fed. Rep. of Germany ... 192/106.2 |
| 2449828 | 9/1980 | France . |
| 2040398 | 8/1980 | United Kingdom . |
| 2100389 | 12/1982 | United Kingdom .......... 464/68 |
| 2103760 | 2/1983 | United Kingdom . |

*Primary Examiner*—Daniel P. Stodola
*Attorney, Agent, or Firm*—Charles E. Brown; Charles A. Brown

[57] ABSTRACT

A torsional damper device comprises an intermediate member responsive to centrifugal force. At low values of torque, beyond a predetermined critical rotation speed, it causes to become operative an elastic intermediate member which is normally inoperative at such low values of torque. This intermediate member comprises at least one flange which, by way of a toothed portion, is selectively interlocked with the hub. By way of a bearing lug, it is adapted to act on the elastic member concerned.

30 Claims, 22 Drawing Figures

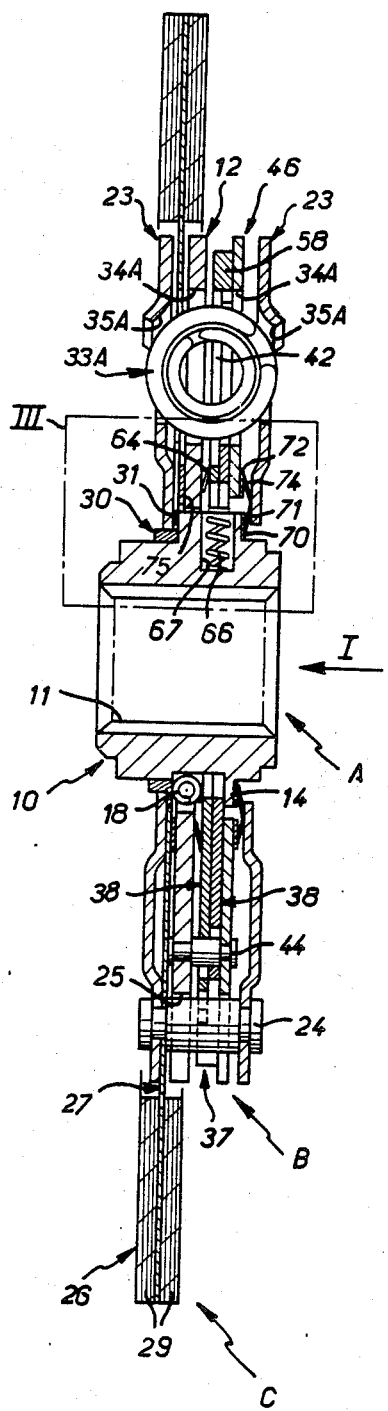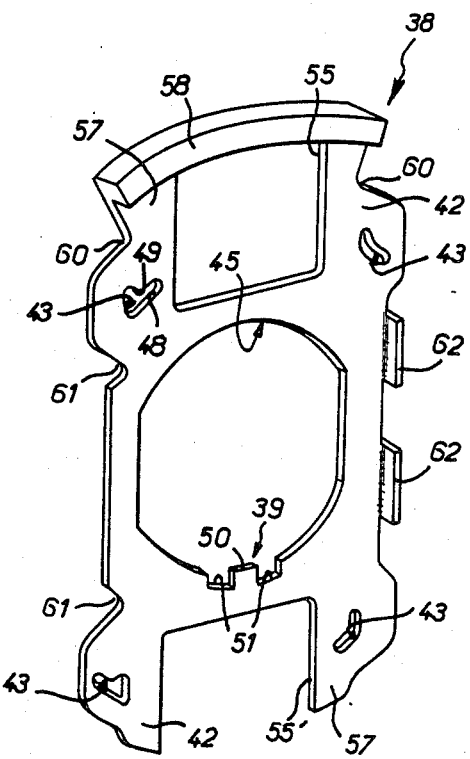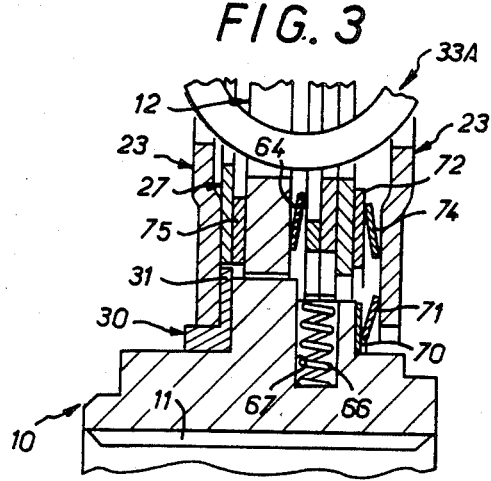

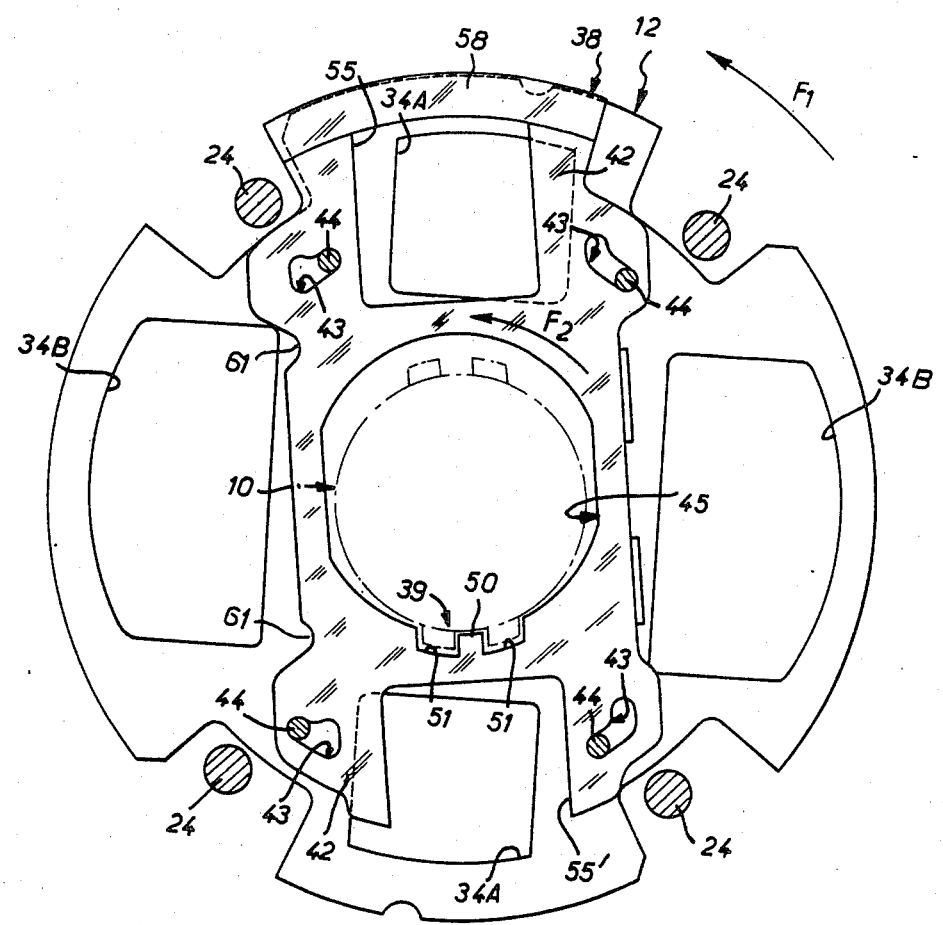

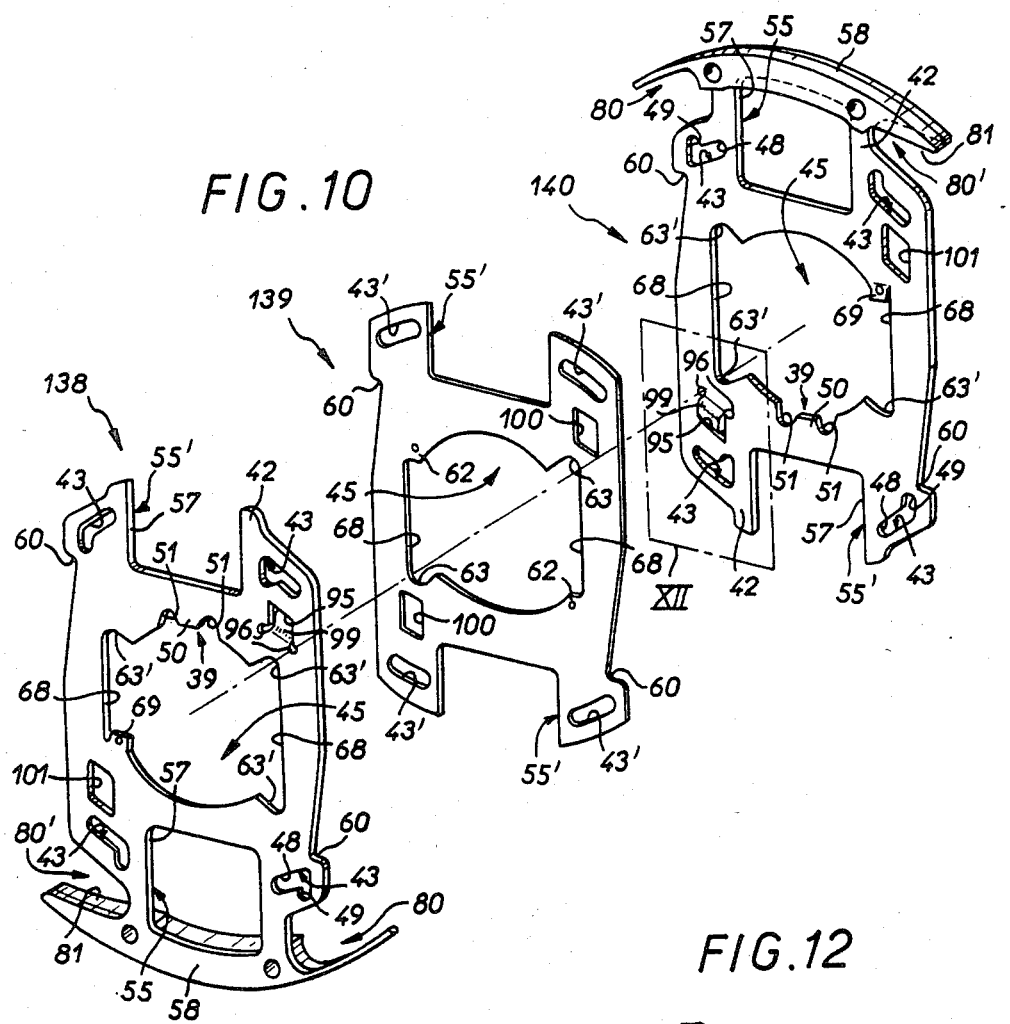

TORSIONAL DAMPER WITH INTERMEDIATE MEMBER FOR RENDERING SPRINGS INOPERATIVE AT LOW TORQUE

BACKGROUND OF THE INVENTION

1. Field of the Invention

The present invention is generally concerned with torsional damper devices comprising at least two coaxial parts disposed to rotate relative to one another within defined limits of relative angular movement against elastic means, commonly called circumferentially acting elastic means, operative circumferentially between them for at least part of such relative angular movement.

2. Description of the Prior Art

As is known, this type of torsional damper device is normally incorporated in the design of a clutch disk, particularly for automobile vehicles, in which case one of the rotary parts carries a friction disk designed to be constrained to rotate with a first shaft, in practice a driving shaft and the motor output shaft in the case of an automobile vehicle, whereas another of said rotary parts is carried on a hub designed to be constrained to rotate with a second shaft, in practice a driven shaft and the gearbox input shaft in the case of an automobile vehicle.

This type of device is used to permit regulated transmission of rotational torque applied to one of its rotary parts where the other is itself subject to a rotational torque, in other words to filter vibrations which may arise at any point in the kinematic system in which it is incorporated, extending from the motor to the driven road wheels in the case of an automobile vehicle.

The present invention is more particularly directed to the case where at least three coaxial parts are employed in a torsional damper device of this kind, said coaxial parts being as previously disposed to rotate relative to one another in pairs within defined limits of relative angular movement against circumferentially acting elastic means operative between them for at least part of such relative angular movement.

These are, in practice, a hub, at least one flange, commonly called the hub flange, constituting a transverse annular member around the hub with, between it and said hub, meshing means implemented with clearance, and at least one ring, commonly called the guide ring, parallel to said hub flange and like the latter forming a transverse annular member around the hub, but independent of the latter.

Between the hub and the hub flange there is formed a first damper stage, a second damper stage being formed between the hub flange and the guide ring or rings.

In the case of a clutch disk, it is the guide ring or rings which more often than not carry the friction disk.

As is known, it is advantageous in certain applications at least, and particularly in those relating to clutch disks for automobile vehicles, for the circumferentially acting elastic means employed between the hub flange and the hub to be low stiffness elastic means.

As is known per se, at low values of torque this arrangement as applied to clutch disks for automobile vehicles advantageously enables gearbox neutral setting noise to be eliminated when the vehicle is stopped, especially when warmed up.

Usually, however, this arrangement has an unfortunate side effect in that it is itself the cause of another type of noise, commonly referred to as a "clunk", when, as applied to an automobile vehicle clutch disk, the driver of the vehicle releases, more or less suddenly, the pressure previously exerted on the accelerator of the vehicle, the operation of the assembly then changing from the so-called "upshift" mode, in which the motor torque predominates over the resisting torque, to the so-called "downshift" mode, in which conditions are the reverse of those applying previously.

The circumferentially acting elastic means disposed between the hub flange and the hub are very rapidly saturated, being of low stiffness. Because of this, there is each time a virtually instantaneous and therefore noisy rocking movement of the hub flange relative to the hub, corresponding to a change in the bearing engagement, from one circumferential direction to the other, between the meshing means with clearance operative between said hub flange and said hub, due to expansion of said circumferentially acting elastic means, previously saturated in a first circumferential direction, followed by renewed saturation of the latter in the opposite circumferential direction.

This "clunk" noise, which also occurs when the accelerator is pressed again, is particularly bothersome when the vehicle is being driven "in traffic", that is to say in the way which may occur in town driving, for example, where the speed of the vehicle is low, possibly near the normal idling speed of the motor, for example, and the torque required from the motor is also low, the motors currently fitted to certain vehicles actually being designed to be able to function under such operating conditions in order to minimize fuel consumption.

Furthermore, it may be accompanied by a rocking movement which, transmitted to the motor and through this to the body of the vehicle concerned, may cause oscillatory movement of the body, especially when the motor is disposed transversely relative to the body, this movement due to the change of direction of the torque being likely to cause discomfort to the driver of the vehicle.

Various solutions intended to alleviate these disadvantages have been proposed, in particular in French patent application No 79 04719 filed 23 Feb. 1979 and published under the number 2 449 828.

According to certain of these proposals, in the general case of a torsional damper device comprising at least two coaxial parts disposed to rotate relative to one another, there is employed a locking member which is responsive to centrifugal force and which, beyond a defined or critical speed of rotation, systematically takes out of service the low stiffness portion of the circumferentially acting elastic means disposed between said rotary parts.

However, as the locking action obtained by means of a locking member of this kind is a positive one, said locking member carries at least temporarily the full torque to be transmitted between the rotary parts concerned.

The value of this torque is not necessarily known, especially when operating under "downshift" conditions, and may be very high.

It is not rare, given these conditions, for sudden breakage of a locking member of this kind to occur.

According to other arrangements described in the aforementioned French patent application No 79 04719, there is employed instead of a locking member an intermediary member also responsive to centrifugal force disposed to move between a standby position in which it is inoperative and, beyond a defined or critical speed of rotation, an operative position in which, being operative between the two rotary parts concerned, for at least one direction of relative rotation between them, it urges in said rotation direction for low values of torque circumferentially acting elastic means other than those normally operative between these rotary parts at the low values of torque concerned, in cooperation with return means continuously urging it towards its standby position.

In other words, by virtue of this intermediary member, the low stiffness circumferentially acting elastic means normally operative between the two rotary parts at low values of torque are prevented from acting alone when said intermediary member is in its operative position and the torque to which this intermediary member is then subjected is moderate and its value well-defined, since it corresponds to part only of the high stiffness circumferentially acting elastic means also disposed between said rotary parts.

In practice, however, the arrangements described in this connection in the aforementioned French patent application No 79 04719 relate to torsional damper devices comprising only two rotary parts.

They can only with difficulty be applied to torsional damper devices comprising at least three such rotary parts.

A general object of the present invention in an arrangement specifically intended for torsional damper devices of this kind.

SUMMARY OF THE INVENTION

The present invention consists in a torsional damper device of the kind comprising at least three coaxial parts disposed to rotate relative to one another in pairs within defined limits of relative angular movement against circumferentially acting elastic means operative circumferentially between them over part at least of such relative angular movement, the device comprising a hub, at least one transverse annular hub flange around said hub, meshing means with clearance between said hub and said hub flange, at least one transverse annular guide ring parallel to said at least one hub flange around said hub but independent thereof, an intermediate member responsive to centrifugal force disposed to be movable between an inoperative standby position and, when the rotation speed exceeds a critical value, an operative position in which it is operative between two of said rotary parts for at least one direction of relative rotation between them to urge in said at least one direction of rotation at least part of said circumferentially acting elastic means other than those normally operative between them, and return means urging said intermediate member towards its inoperative standby position, wherein said intermediate member comprises, for the purpose of its operation between said hub flange and said hub, at least one flange which is radially movable and guided by said hub flange and comprises a toothed portion through which, in its operative position, it cooperates with a complementary toothed portion on said hub and which comprises a bearing lug through which it is operative on at least part of said circumferentially acting elastic means disposed between said hub flange and said at least one guide ring.

In practice two diametral flanges disposed in head-to-tail relationship relative to one another are employed.

Be this as it may, when the speed of rotation of the assembly is sufficient, the flange or flanges automatically lock onto the hub so that, during functioning of the assembly under "downshift" conditions, at least part of the circumferentially acting elastic means disposed between the guide ring or rings and the hub flange bears circumferentially on the bearing lug of a flange of this kind, due to the action of these guide rings.

The relevant portion of the circumferentially acting elastic means is then operative at low values of torque between the hub flange and the hub, independently of the circumferentially acting elastic means specifically disposed between the hub flange and the hub, since said flange or flanges is or are then constrained to rotate with said hub.

In other words, and as required, the low stiffness circumferentially acting elastic means specifically disposed between the hub flange and the hub are then prevented from acting alone.

Also, and if required, the capacity for relative angular movement between the coaxial parts concerned may be favored.

The applicant has been able to show the advantage of widening the flanges, especially the marginal area separating the edges of the flange from the nearest openings providing for guiding the latter.

The durability of the flange is significantly increased in this way, which is a particularly important quality criterion in the principal application area of the invention, which is to clutches for automobile vehicles.

It is desirable to synchronize the radial movement of the two flanges, to enable them to be placed in the operative position at a predetermined speed of rotation of the rotary parts employed.

In one embodiment of the invention, an intermediary member advantageously comprises three coaxial parts disposed to rotate in pairs, wth an intermediate flange radially fixed between two mobile flanges.

Each of said mobile flanges is preferably coupled to the intermediate flange by elastic means disposed one on each side of the hub, one elastic means coupling one of the mobile flanges to the intermediate flange and the other elastic means coupling the other mobile flange to the intermediate flange.

Said elastic means are preferably springs disposed substantially parallel to said flanges.

In accordance with another aspect of the invention, the mobile flanges are each in sliding contact with one side of the intermediate flange over which they move radially.

In accordance with another aspect of the invention, means are provided for guiding radial displacement of the mobile flanges and preventing any relative angular movement between the mobile flanges and the intermediate flange.

Said guide means advantageously comprise guide tabs cut out of the mobile flanges on three sides and bent so as to project axially towards the intermediate flange, said guide tabs being able to slide in openings formed in the other two flanges so as to permit displacement in one direction only parallel to the direction of radial displacement of the flanges of the tabs in the openings and to prevent any relative displacement in any other direction. Said openings extend radially over a sufficient distance to permit sufficient displacement of the guide tabs for relative radial displacement of the flanges to permit total engagement of the toothed portions of the radially mobile flanges with the toothed portion of the hub.

In this way the flanges can move only radially relative to one another, the guide means preventing any angular relative movement. Also, their radial relative movement is controlled by the dimensions of the openings.

The characteristics and advantages of the invention will emerge from the following description given with reference to the accompanying drawings.

BRIEF DESCRIPTION OF THE DRAWINGS

FIG. 2 is a view of it in axial cross-section on the broken line II—II in FIG. 1.

FIG. 3 shows to a larger scale the detail of FIG. 2 within a box III on the latter.

FIG. 4 is a perspective view of one of the flanges constituting the intermediary member employed in accordance with the invention in this torsional damper device, shown in isolation.

FIGS. 5A, 5B, 5C are partial views in elevation showing various possible positions for a flange of this kind.

FIG. 10 is a perspective view of three flanges constituting an intermediate member in accordance with the invention in another embodiment.

FIG. 12 is a view to a larger scale of a detail within a box XII in FIG. 10.

FIG. 13 is a cross-section on the line XIII—XIII of part of the intermediate member shown in FIG. 11.

DESCRIPTION OF THE PREFERRED EMBODIMENTS

The figures show, by way of example, the application of the invention to a clutch disk, in particular a clutch disk for automobile vehicles.

The torsional damper device which consitutes this clutch disk generally comprises three coaxial parts A, B and C disposed to rotate relative to one another in pairs within defined limits of relative angular movement against elastic means, commonly called circumferentially acting elastic means, operative circumferentially between them over part at least of such relative angular movement.

The part A consists of a simple hub 10 designed to be constrained to rotate with a shaft (not shown), in practice the input shaft of the gearbox of the vehicle concerned, constituting a driven shaft.

To this end the internal bore 11 in the hub 10 is splined, for example, as schematically shown here.

The part B comprises a flange 12, commonly called the hub flange, forming a transverse annular member around the hub 10, with meshing means 13 implemented with clearance between it and said hub 10.

Figure 1:
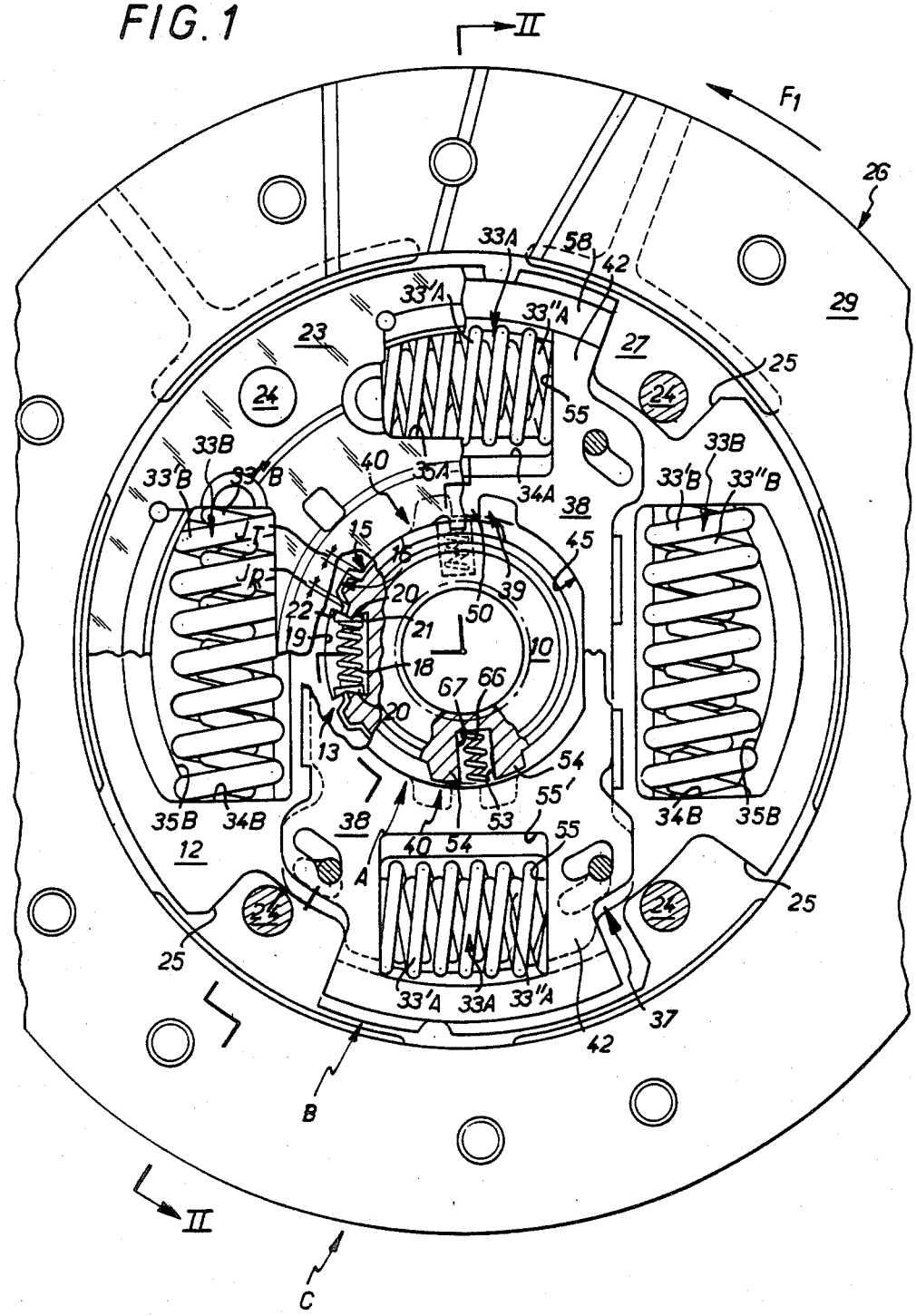
FIG. 1 is a partial view in elevation, locally cut away, of a torsional damper device in accordance with the invention, seen in the direction of the arrow I in FIG. 2.

These meshing means 13 with clearance, which are visible in FIG. 1 in particular by virtue of a cut away part of the latter, are in practice operative between the edge of the inside periphery of the hub flange 12 and a collar 14 projecting radially from the outside periphery of the hub 10.

They comprise, in the case of the hub 10, a toothed portion 15 and, in the case of the hub flange 12, a toothed portion 16 the teeth of which are interleaved with clearance with those of the previous toothed portion.

The circumferentially acting elastic means disposed circumferentially between the parts A and B comprise, in the embodiments shown, at least one spring 18 which is disposed in a housing 19 formed partly by an opening in the toothed portion 15 of the hub 10 and partly by an opening, facing the previous opening, in the toothed portion 16 of the hub flange 12 and which, in the inoperative configuration of the assembly shown in FIG. 1, bears at each of its circumferential ends simultaneously, in practice through the intermediary of a bearing peg 20 in these embodiments, on a shoulder 21 of said hub 10 and on a shoulder 22 of said hub flange 12.

A spring 18 of this kind is a spring of low stiffness.

In practice, two springs 18 are provided in this way, in diametrically opposite positions relative to one another.

Only one is visible in the figures, however.

For the inoperative configuration of the assembly there is between the toothed portion 15 of the hub 10 and the toothed portion 16 of the hub flange 12 a circumferential clearance JT in a first circumferential direction which, as indicated by the arrow F1 in FIG. 1, is assumed to be the normal direction of rotation of the assembly and which therefore corresponds to "upshift" functioning of the assembly. For the opposite circumferential direction, which thus corresponds to "downshift" functioning of the assembly, there is a circumferential clearance JR.

The circumferential clearances JT and JR may be the same.

In practice, however, in the embodiments shown the circumferential clearance JT is greater than the circumferential clearance JR.

The part C comprises at least one ring 23, commonly called the guide ring, which is parallel to the hub flange 12 and like the latter forms a transverse annular member around the hub 10, although it has no direct relationship with the latter.

In practice, two guide rings 23 are provided in this way, axially spaced from one another and one on each side of the hub flange 12.

The two guide rings 23 are linked to one another by pegs 24, which, being four in number in the embodiments shown, extend axially with clearance through the hub flange 12 by means of notches 25 provided to this end at the periphery of the latter. At their ends they are riveted to said guide rings 23.

The part C further comprises a friction disk 26.

This friction disk itself comprises, on the one hand, a flange 27 which may possibly be divided into sectors and which, in back-to-back relationship with a guide ring 23, is fastened to the latter by the pegs 24 already fastening it to the other guide ring 23, and, on the other hand, two friction facing members 29 at the outside periphery of the flange 27, one on either side thereof.

In the embodiments shown, the flange 27 of the friction disk 26 extends over substantially all of the surface of the guide ring 23 which it flanks and, for centering the part C assembly thus formed relative to the hub 10 constituting the associated part A, there is provided a bearing 30 at the inside periphery of the guide ring 23, between it and said hub 10.

In practice, this bearing 30 is constrained to rotate with the guide ring 23 with which it is associated and it features a transverse collar 31 between the latter and the collar 14 of the hub 11, in contact with the latter.

By virtue of clamping of the friction facing members 29 of its friction disk 26 between two plates, the part C is adapted to be constrained to rotate with a shaft, in practice the output shaft of the motor of the vehicle concerned, constituting a driving shaft.

In the embodiments shown, the circumferentially acting elastic means disposed circumferentially between the part B and the part C comprise a plurality of elastic members 33A, 33B regularly distributed in the circumferential direction and all substantially tangential to the same circumference of the assembly.

In practice, in these embodiments there are thus two elastic members 33A and, alternating with these, two elastic members 33B, each of the elastic members 33A and 33B consisting of two coaxial helical springs 33'A, 33"A and 33'B, 33"B.

In practice the elastic members 33A are less stiff than the elastic members 33B, although their stiffness is significantly greater than that of the aforementioned springs 18.

They are each accommodated partly in an opening 34A, 34B in the hub flange 12, in practice an enclosed hole in the latter, and partly in openings 35A, 35B in the guide rings 23, in practice enclosed holes in the latter.

In the embodiments shown, the openings 34A, 35A, which are in corresponding relationship to one another, have the same circumferential dimension, and the same goes for the openings 34B, 35B.

However, as an alternative to this and in a manner which is known per se, there may be differences between the circumferential dimensions of these various openings, for staggered intervention of the corresponding elastic members during relative angular movement of the assembly.

The foregoing arrangements are moveover well known per se and as they do not of themselves constitute part of the present invention they will not be described in more detail here.

In a manner which is also known per se, the torsional damper device in accordance with the invention further comprises an intermediary member 37 responsive to centrifugal force mounted to move between a standby position, in which it is inoperative, and, above a defined or critical rotation speed of the assembly, an operative position in which, being operative between two of the component parts of the torsional damper device, for at least one direction of relative rotation therebetween, it urges in said at least one rotation direction at least part of the circumferentially acting elastic means other than those normally operative between said rotary parts.

In accordance with the invention, provided in order to be operative between the rotary part B that the hub flange 12 constitutes or of which it forms part, on the one hand, and the rotary part A which the hub 10 constitutes, on the other hand, this intermediary member 37 comprises at least one flange 38 which is radially mobile and guided, for this purpose, by the hub flange 12, which comprises a toothed portion 39 through which it is adapted to be engaged, in an operative position, with a complementary toothed portion 40 provided for this purpose on the hub 10, and which also comprises at least one bearing lug 42 through which it is adapted to then operate on a portion at least of the circumferentially acting elastic means disposed between said hub flange 12 and the guide rings 23.

In practice the intermediary member 37 comprises two diametral flanges 38 disposed in head-to-tail relationship relative to one another.

Each of the two flanges 38 features slots 43 by means of which they are conjointly engaged on guide pegs 44 carried by and axially projecting for this purpose from the hub flange 12.

In practice, each extends on either side of the axis of the assembly, being engaged with clearance over the hub 10 by means of a central opening 45.

In the embodiments shown, four guide pegs 44 are provided on the hub flange 12 with the same number of slots 43 in the flanges 38, and said guide pegs 44, and therefore also said slots 43, are in a substantially cruciform or X-shaped relationship relative to the axis of the assembly.

In the embodiments shown, there is associated with the hub flange 12 a counter-flange 46 which is parallel to and spaced from said hub flange 12 and which is constrained to rotate with the hub flange 12 by the axial guide pegs 44 carried by the latter, said guide pegs 44 extending axially, like the pegs 24, and being riveted by their ends to said hub flange 12 and to said counter-flange 46.

Like the hub flange 12, the counter-flange 46 features openings 34A for the elastic members 33A, 33B, in correspondence with respective openings in said hub flange 12.

The flanges 38 constituting in accordance with the invention the intermediary member 37 extend between the hub flange 12 and the counter-flange 46 in this way associated with the latter.

Each of the slots 43 which the flanges 38 feature has two sections, namely a curved section 48 extending generally circumferentially and centred on the axis of the assembly, all these being disposed on the same circumference of the latter, and a straight section 49 disposed at one circumferential end of the foregoing section, extending substantially parallel to the dimetral plane of the assembly passing through the median area of a flange 38.

For all the slots 43 the curved section 48 extends circumferentially away from the same end of the straight section 49 associated with it.

This is the end opposite that which, as indicated by the arrow F1 in FIG. 1, corresponds to the normal direction of rotation of the assembly.

For two of the slots 43, those situated on the side opposite the toothed portion 39, the straight section 49 extends in the direction away from said toothed portion 39 from the curved section 48 with which it is associated; on the other hand, in the case of the other two slots 43, those on the same side as the toothed portion 39, it extends towards the latter.

Be this as it may, the two sections 48, 49 which each slot 43 in each of the flanges 38 thus features merge with one another through broadly rounded linking curves.

The toothed portion 39 of each flange 38 is obtained in practice by cutting the edge of its central opening 45.

In the embodiments shown, it reduces to a single tooth 50 bracketed by two recesses 51.

Conjointly, the corresponding toothed portion 40 formed on the hub 10 is reduced, for each flange 38, to a single slot 53 formed axially between two axial bosses 54 on the periphery of the radial collar 14 of the hub 10, said groove 53 being complementary to the tooth 50 of a flange 38 while said bosses 54 are themselves each complementary to the respective recesses 51 in the latter.

For preference, and as shown here, the teeth of the complementary toothed portions 39, 40 thus provided on the flanges 38, on the one hand, and the hub 10, on the other hand, have flanks which are slightly oblique relative to a radius of the assembly passing through their medium area and rounded edges, in order to facilitate their mutual interlocking and their subsequent disengagement.

However, the corresponding obliqueness is preferably limited to a few degrees, for example, so that the resulting radial component of the forces transmitted between the hub 10 and the flanges 38 when the latter are interlocked therewith does not give rise to high stresses in the flanges 38 or stresses sufficient to result in untimely disengagement of said flanges 38 from said hub 10.

Each of the flanges 38 constituting the intermediary member 37 in accordance with the invention comprises at least one opening 55 by means of which it is engaged over one of the elastic members 33A disposed circumferentially between the hub flange 12 and the guide rings 23.

In practice, in the embodiments shown, a flange 38 extends on each side of the axis of the assembly and thus has two openings 55, 55′ disposed one on each side of the axis of the assembly, being in substantially diametrically opposed positions relative to one another, each engaged over a respective one of the two elastic members 33A.

The opening 55 in each flange 38, which is that disposed on the side opposite the toothed portion 39 relative to the axis of the assembly, is an enclosed hole, whereas the opening 55′, which is thus on the same side as the toothed portion 39 relative to said axis, is merely a notch.

Be this as it may, one of the edges of each opening 55, 55′ constituting its circumferential ends itself forms the corresponding bearing lug 42.

In practice, this is the edge which is on the trailing side, that is to say the rear edge, relative to the circumferential direction corresponding to the normal direction of rotation of the assembly, as indicated by the arrow F1 in FIGS. 1 and 5.

In the inoperative configuration of the assembly, the other edge 57 of an opening 55, 55′, which is thus its leading edge, is preferably at a distance from the corresponding elastic member 33A.

In order to be more responsive to centrifugal force, each of the flanges 38 constituting the intermediary member 37 in accordance with the invention preferably and as shown here carries a flyweight 58.

In the embodiments shown, the flyweight 58 extends along one of the circumferential edges of a flange 38; more precisely, it extends along that of the circumferential edges of the flange 38 which is disposed on the opposite side of the axis of the assembly relative to its toothed portion 39.

It consists of a locally increased thickness of the flange 38, for example and as shown here.

It may equally well consist of a portion of the flange folded upon itself, however.

Be this as it may, the flyweight 58 on each of the flanges 38 extends axially towards the other of the flanges 38, being developed by means of the thickness of the latter.

Its inherent thickness is preferably less than that of a flange 38, so as not to project axially beyond the latter.

Laterally, that is to say at its lateral edges substantially parallel to the diametral plane of the assembly passing through its medium area, each of the flanges 38 features cut-outs 60 adapted to prevent it interfering with the nearby pegs 24 on relative angular movement of said assembly.

On one of its lateral edges it further features cut-outs 61 also adapted to prevent it interfering with the corresponding elastic member 33B on such relative angular movement.

Along the other of its lateral edges each of the flanges 38 further features at least one right-angle lip 62 by means of which it is axially engaged over the opposite lateral edge of the other.

In the embodiments shown, two right-angle lips 62 are provided in this way on one of the lateral edges of each of the flanges 38, these being at a distance from one another.

In practice the two flanges 38 are axially in contact with one another, and they are maintained in contact due to the operation of specific axially acting elastic means provided for this purpose.

In the embodiments shown, these axially acting elastic means comprise a Belleville spring 64 which, bearing on the hub flange 12, presses on that of the flanges 38 which is axially nearer it and thus urges the combination of the flanges 38 in the direction towards the counter-flange 46, to bear on the latter.

As will be readily understood, each flange 38 may, for example, be formed from a metal blank, appropriately cut and bent, whether the flyweight 58 which it carries is attached to it in some appropriate manner, as by welding, for example, or is formed by folding it, as mentioned hereinabove.

For effective sliding of the one in contact with the other, their corresponding surfaces at least are preferably provided with synthetic material facings, of polytetrafluoroethylene, for example, favoring such sliding.

With the intermediary member 37 thus constituted, in accordance with the invention, by the two flanges 38, there are associated return means for urging it in the direction towards its standby position.

In the embodiments shown, these are elastic means.

In the embodiment specifically shown in FIGS. 1 through 6, these elastic means comprise, for each flange 38, a spring 66 which, housed in a radial bore 67 in the hub 10, being attached by its base to the latter, is adapted to act on the tooth 50 of the toothed portion 39 of one flange 38, in a direction appropriate to opposing its penetration into the corresponding groove 53 in said hub 10.

For the inoperative position of the assembly (FIG. 1) there is a circumferential offset equal to the aforementioned circumferential clearance JT between, on the one hand, a tooth 50 of this kind and, on the other hand, a groove 53 of this kind.

Furthermore, for said inoperative position of the assembly, the flanges 38 constituting in accordance with the invention the intermediary member 37 are both in the standby position, for which there is also a radial offset between their toothed portion 39 and the corresponding toothed portion 40 of the hub 10.

For this standby position, in which it is inactive, it is through the straight section 49 of its slots 43 that a flange 38 of this kind is engaged with the guide pegs 44 carried by the hub flange 12, more precisely by the portion of a straight section 49 of the slots 43 farthest from the curved section 48 thereof.

The openings 55, 55' which a flange 38 features are conjointly superposed, in plan view, with the corresponding openings 34A in the hub flange 12 and the counter-flange 46; however, as mentioned hereinabove, there is a slight circumferential offset in the circumferential direction which, as marked by the arrow F1 in FIG. 5A, corresponds to the normal direction of rotation of the assembly, from the edge 57 of these openings 55, 55' opposite the bearing lugs 42.

Each of the flanges 38 constituting the intermediary member 37 in accordance with the invention thus remains in its standby position for as long as the speed of rotation of the assembly remains less than a defined critical speed of the order of 800 rpm, for example.

As soon as this critical speed is achieved, each of the flanges 38 moves radially due to the centrifugal force to which it is then subjected, being guided in this radial movement by the guide pegs 44 with which it is interlocked, everything then occurring as if the latter were moving along the straight section 49 of the corresponding slots 43.

Figure 5A:
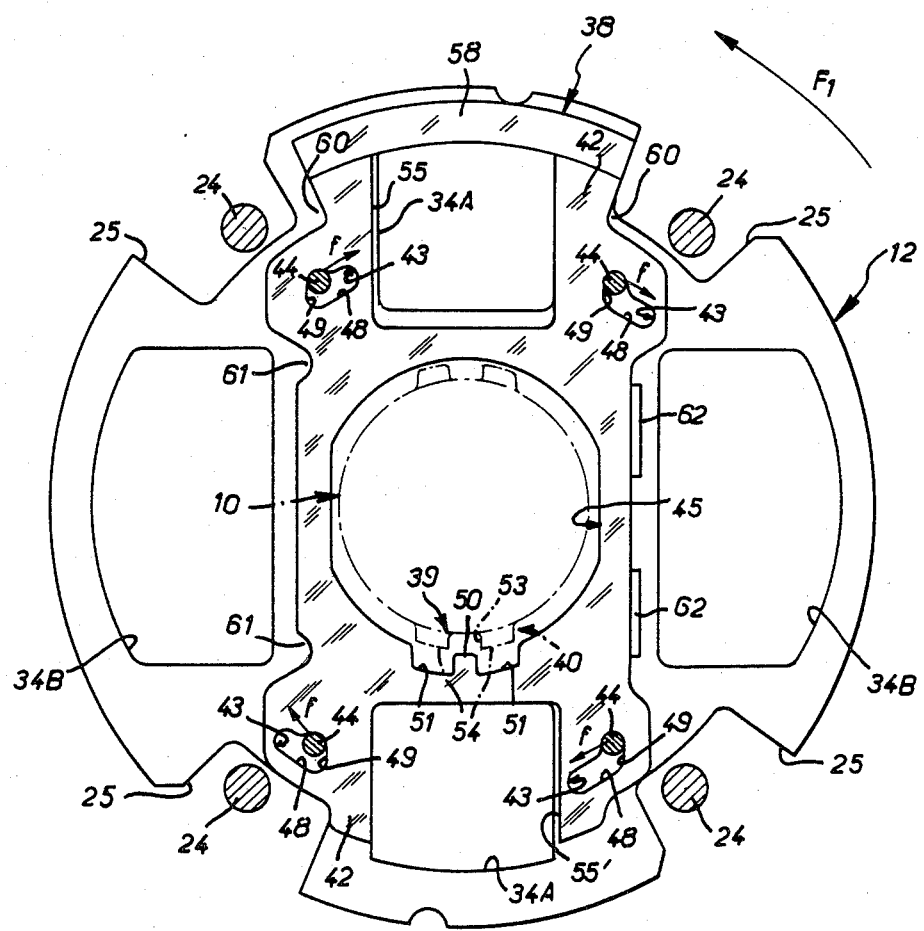
Figure 5B:
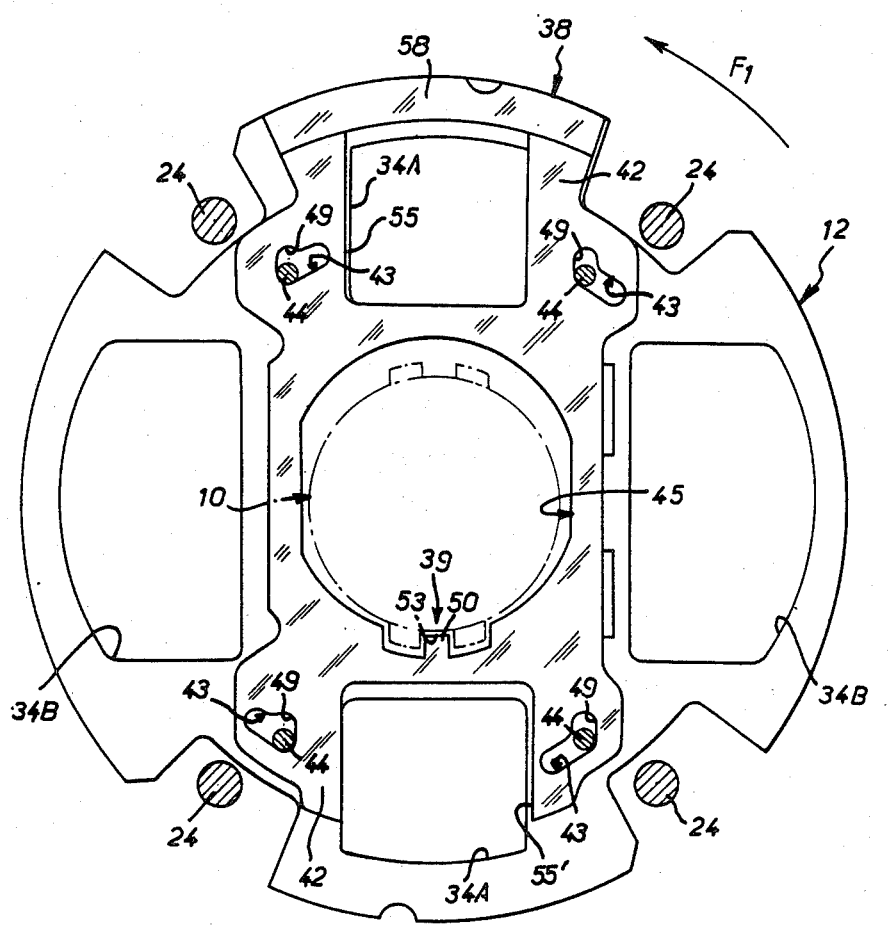

If, at this critical speed, the toothed portion 39 of each of the flanges 38 is located circumferentially opposite the corresponding toothed portion 40 of the hub 10, as shown in FIG. 5A, a flange 38 of this kind then goes to an operative position in which, at the end of its radial displacement, and as shown in FIG. 5B, it is interlocked through its toothed portion 39 with the corresponding toothed portion 40 of the hub 10.

The curved section 48 of each of its slots 43 is then aligned with the corresponding guide pegs 44 of the hub flange 12, extending along the circumference on which the latter are located.

As shown in the case of one of them in FIG. 5C, each of the flanges 38 constituting in accordance with the invention the intermediary member 37 can then pivot around the axis of the assembly relative to the hub flange 12, everything occurring as if the guide pegs 44 carried by the latter were then moving along the curved section 48 of its slots 43.

By construction, and for reasons which will emerge hereinafter, the circumferential extent of the section 48 of the slots 43 is made at least equal, as measured angularly, to the total circumferential clearance JT+JR of the meshing means 13 with clearance operative between the hub flange 12 and the hub 10.

Be this as it may, and as shown in FIG. 5C for one of them, during such pivoting movement each of the flanges 38 encroaches, as seen in plan view, through its bearing lugs 42 on the openings 34A in the hub flange 12 and thus on the housings for the elastic members 33A, and is thus able to act on the latter in order to urge them into action.

The specific functioning of the flanges 38 constituting the intermediary member 37 in accordance with the invention now having been described, reference will now be made to FIGS. 6A to 6H with regard to overall device operation.

These are schematic figures in which the components involved are shown only in very general terms.

For example, the hub 10 is shown only as a simple bar and the same opening in it participates, on the one hand, in the meshing means 13 with clearance provided between the hub 10 and the hub flange 12 and, on the other hand, in the toothed portion 40 through which a hub 10 of this kind has to cooperate with the toothed portion 39 of a flange 38, the corresponding toothed portions of said hub flange 12 and said flange 38 being moreover shown only by a boss adapted to penetrate into an opening of this kind.

Furthermore, only one of the flanges 38 is shown in these figures and likewise a single spring 18, a single elastic member 33A and a single elastic member 33B.

The counter-flange 46 is not shown here at all.

On the other hand, both of the two guide rings 23 are shown.

Figure 6A:
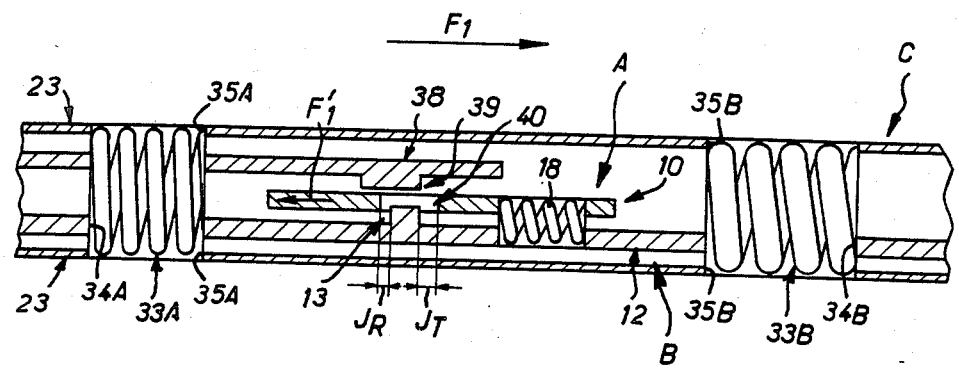
FIGS. 6A, 6B, 6C, 6D, 6E, 6F, 6G, 6H are simplified views in circumferential cross-section, developed in the flat, of the torsional damper device in accordance with the invention, showing in detail but schematically various successive phases of the functioning of this torsional damper device.

As mentioned hereinabove and as shown in FIG. 6A there exists in the inoperative position, between the toothed portion 39 of a flange 38 and the corresponding toothed portion 40 of the hub 10, a circumferential offset corresponding to the circumferential clearance JT of the meshing means 30 with clearance provided between the hub flange 12 and the hub 10.

When, in operation, torque is applied to the part C and thus to the guide rings 23 which form part of the latter, it is normally the guide rings 23 which, entrained in the direction of rotation of the assembly, as shown by the arrow F1 in FIG. 6A, tend to entrain the hub 10 through the intermediary of the various circumferentially acting elastic means employed.

To simplify the following account, it will nevertheless be assumed here that, as compared with this process, it is the hub 10 which tends to entrain in the circumferential direction opposite to the foregoing direction, as shown by the arrow F'1 in FIG. 6A, the guide rings 23, through the intermediary of said circumferentially acting elastic means.

During a first stage, only the springs 18 disposed circumferentially between the hub 10 and the hub flange 12 yield elastically, these springs 18 having, as mentioned hereinabove, a relatively low stiffness, very much lower in all cases than that of the elastic members 33A, 33B.

Figure 6B:
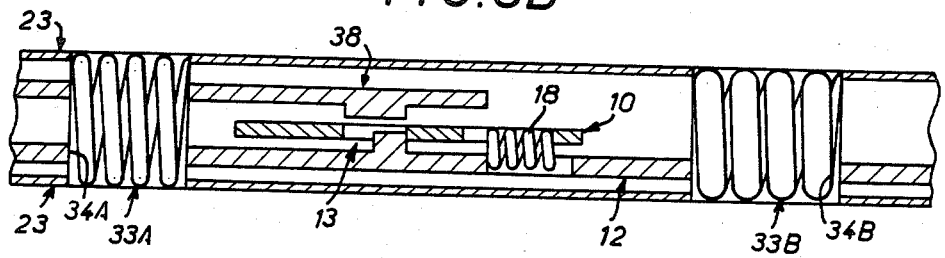

This first phase of operation continues until, the springs 18 being saturated, the circumferential clearance JT of the meshing means 13 with clearance between the hub 10 and the hub flange 12 is absorbed (FIG. 6B).

During this first phase of operation, everything occurs as if the parts B and C, that is to say the hub flange 12 and the guide rings 23, were locked to one another in the angular sense, given the relatively high stiffness of the elastic members 33A, 33B disposed between them.

Figure 7:
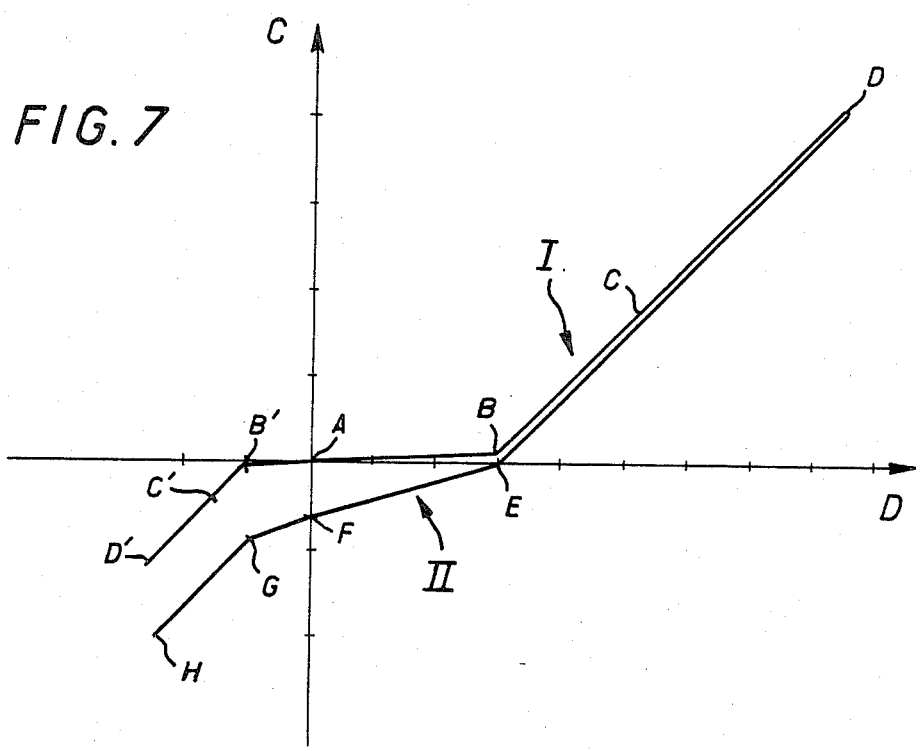
FIG. 7 is a diagram illustrating this functioning.

FIG. 7 is a diagram on which the overall angular displacement D between the parts A and C is plotted along the horizontal axis and the torque C transmitted from one to the other is plotted along the vertical axis. On this diagram the curve representing this stage of operation is a straight line AB starting at the origin and of relatively low slope, reflecting the stiffness of the springs 18 which are alone operative at this time.

As will be noted, at the end of the first phase of operation explained above, the toothed portion 39 of each of the flanges 38 constituting in accordance with the invention the intermediary member 37 is angularly aligned with the corresponding toothed portion 40 of the hub 10, as represented schematically in FIG. 6.

Each of the flanges 38 is temporarily constrained by the guide pegs 44 carried by the hub flange 12 to rotate with the hub flange 12, which alleviates the consequences of any inertia effects which may cause the flanges 38 to lag circumferentially relative to the guide rings 23 and thus to remain circumferentially aligned with the hub 10.

To this end the guide pegs 44 on the hub flange 12 bear on the flank of the curved section 49 of the slots 43 in the flanges 38 which is circumferentially nearest the opposite end of the curved section 48 of the slots 43, in the direction of the arrows f in FIG. 5A.

Entrained in this way by the hub flange 12, the initial circumferential offset of the flanges 38 relative to the hub 10 is taken up, to the extent of the circumferential clearance JT between the hub flange 12 and the latter.

As the torque C applied to the part C increases, the elastic members 33A, 33B in turn come into action, adding their effects to those of the springs 18, which remain compressed and thus saturated.

Everything proceeds as if, for the circumferential direction in question, the hub flange 12 were angularly locked to the hub 10, so that the elastic members 33A, 33B are then compressed between the points where they bear on the hub flange 12, on the one hand, and the points where they bear on the guide rings 23, on the other hand.

Figure 6C:
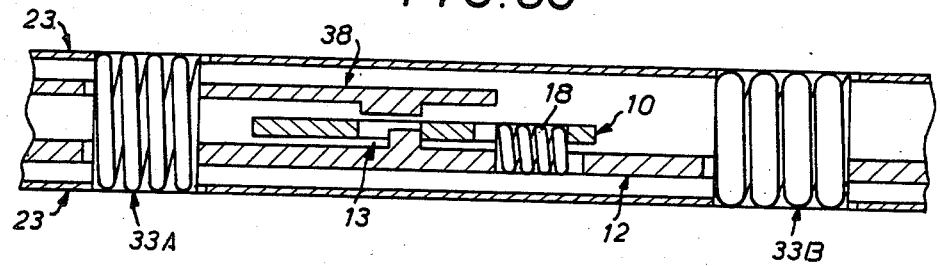

During the second phase of operation which then begins, these elastic members 33A, 33B are progressively compressed (FIG. 6C).

This second phase of operation continues until (FIG. 6D) there occurs positive bearing engagement for the circumferential direction in question between the part B of which the hub flange 12 forms part and the part C of which the guide rings 23 form part, either because certain at least of the elastic members 33A, 33B operative between these parts B and C then have their turns contiguous, or because the pegs 24 linking the rings 23 together come into contact with the corresponding circumferential edge of the notches 25 in the hub flange 12 through which they pass.

In the diagram of FIG. 7, the curve representing this second phase of operation is a second straight line BCD of significantly greater slope than the previous straight line AB, reflecting the relatively high stiffness of the elastic members 33A, 33B.

The functioning as previously described is in the so-called "upshift" condition, the driving torque applied to the part C being higher than the resistive torque to which the driven part A is subject.

As will be noted, and given the circumferential offset between the edge 57 of their openings 55, 55' and the corresponding edges of the openings 34A in the hub flange 12 and the counter-flange 46, for such "upshift" functioning the flanges 38 constituting in accordance with the invention the intermediary member 37 do not participate in the transmission of torque bewteen the parts C and A.

If at any time the torque between the parts C and A is reversed, the situation changing from an "upshift" to a "downshift" one, and if, to clarify this explanation, the intermediary member 37 is temporarily ignored, a process which is the converse of the preceeding process takes place: firstly, the elastic members 33A, 33B expand, followed by the springs 18, along the straight lines DCB and BA.

This expansion, which is virtually instantaneous, is then followed by recompression in the circumferential direction opposite to the previous direction, firstly of the springs 18 and then of the elastic members 33A, 33B, following straight lines AB' and B'C'D' of the same type as previously.

Figure 6D:
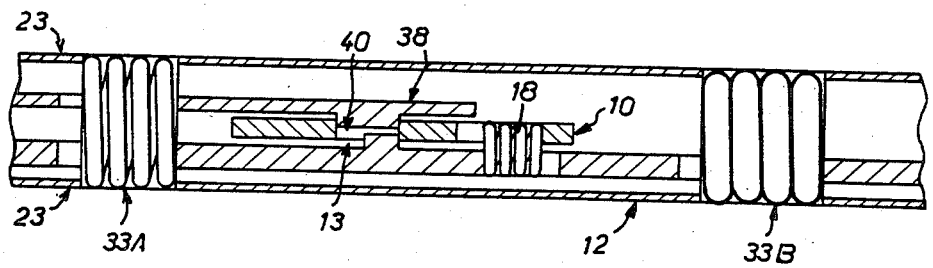

In reality, however, and as schematically shown in FIG. 6D, assuming that the speed of rotation of the assembly is greater than the corresponding critical speed, in the intervening period the flanges 38 constituting in accordance with the invention the intermediary member 37 have come into play, each of these flanges having by then passed from its initial standby position to its operative position in which, through its toothed portion 39, it is interlocked with the corresponding toothed portion 40 of the hub 10, and is thus from this time constrained to rotate with the latter.

Consequently, "downshift" operation is modified.

Figure 6E:
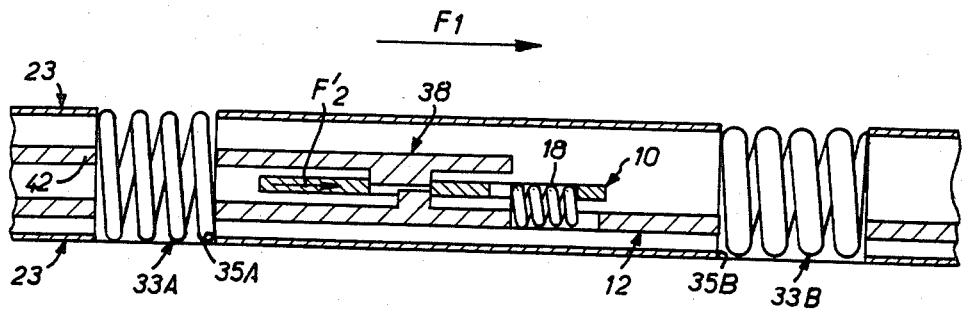

For such "downshift" operation, it is now the hub 10 which tends to entrain the assembly in the circumferential direction, through the intermediary of the various circumferentially acting elastic means employed, everything proceeding as if, relative to the hub flange 12 and to the guide rings 23, and as schematically represented by the arrow F'2 in FIG. 6E, the hub flange 12 were to move in a circumferential direction identical to that indicated by the arrow F1, which corresponds to the normal direction of rotation of the assembly, which is naturally unchanged.

During a first stage, and as previously, there is firstly virtually instantaneous expansion of the elastic members 33A, 33B (FIG. 6E), along a straight line DE substantially identical to the straight line DCB on the diagram (FIG. 7).

However, at the end of such expansion of the elastic members 33A, 33B each of the flanges 38 constituting in accordance with the invention the intermediary member 37, entrained by the hub 10, is caused to act on the elastic member 33A through its bearing lugs 42.

During the new phase of operation which then begins, the elastic members 33A are progressively loaded in compression between the points at which they bear on the guide rings 23, on the one hand, and the corresponding bearing lug 42 of the flanges 38, on the other hand.

Figure 6F:
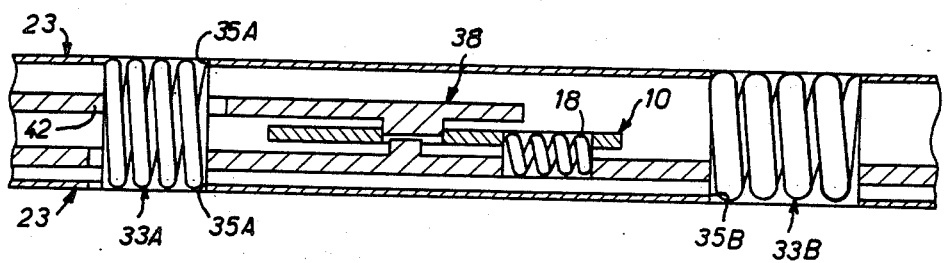

As long as the corresponding relative angular movement remains less than the circumferential clearance JT of the meshing means 13 with clearance between the hub 10 and the hub flange 12, the springs 18 expand conjointly (FIG. 6F).

Figure 6G:
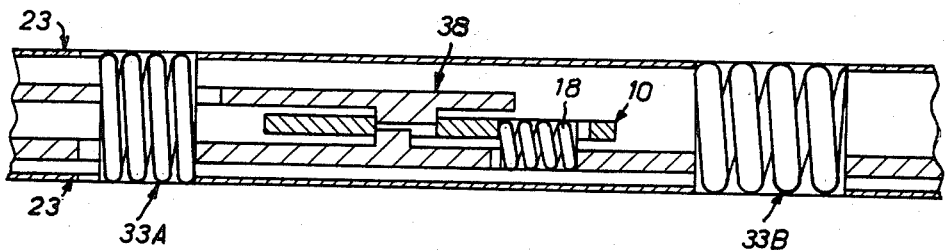

There is then limited recompression in the opposite direction of these springs 18, until the remaining circumferential clearance JR between the hub 10 and the hub flange 12 is taken up (FIG. 6G).

The curve representing this second phase of operation therefore consists of two straight lines EF, FG in succession which, taken together, are widely spaced from the foregoing straight lines BA, AB', being separated by a moderate break indicative of the recompression of the springs 18.

Thus during this phase of operation, which corresponds to low values of the torque C, the springs 18 are prevented from acting alone, the elastic members 33A, which are of significantly greater stiffness, being on the other hand caused to operate by the flanges 38 constituting in accordance with the invention the intermediary member 37.

Figure 6H:
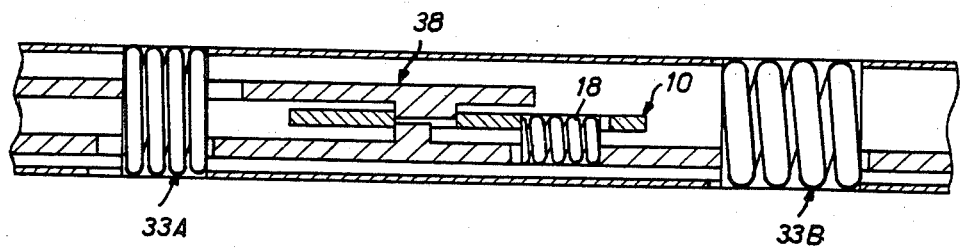

Finally, there occurs progressive recompression of the elastic members 33B, these then adding their effects to those of the elastic members 33A and those of the springs 18, which remain slightly compressed (FIG. 6H).

The curve representing this final phase of operation is a straight line GH the slope of which is identical to that of the previous straight line B'C'D'.

Thus, in "downshift" functioning, according to whether the flanges 38 constituting in accordance with the invention the intermediary member 37 are in service or not, the curve representing the operation of the assembly is the curve II formed by the segments DE, EFG and GH or the curve I formed by the segments BCD, BAB' and B'C'D'.

In practice, a relatively low speed of rotation is sufficient for these flanges 38 to remain operative in this way.

However, when this speed of rotation drops below the selected critical speed, the springs 66 associated with the flanges 38 return the latter to the standby position.

It will be understood that in order to simplify the foregoing description no account has been taken of the hysteresis phenomenon occurring, on relative angular displacement D, by virtue of friction between the parts A, B and C concerned.

As is known, this phenomenon of hysteresis results in a difference, for a given relative angular displacement D, between the value of the torque corresponding to an increasing torque and that corresponding to a decreasing torque.

In the embodiments shown, various friction rings are provided for this purpose, in addition to the bearing 30 which is operative between the parts C and A.

Thus there is a first friction ring 70 disposed on the side of the radial collar 14 of the hub 10 opposite the bearing 30 and maintained in contact with the corresponding flank of this radial collar 14 by a spring washer 71, a Belleville spring, for example, bearing on the nearby guide ring 23.

There is also a second friction ring 72 disposed on the side of the counter-flange 46 facing towards the nearby guide ring 23 and maintained in contact with the counter-flange 46 by a spring washer 74, a Belleville spring, for example, bearing on said guide ring 23.

Finally, between the hub flange 12 and the flange 27 of the friction disk 26 there is a third friction ring 75 which, like the friction ring 72, is subject to the action of the spring washer 74 associated with the latter.

As will be readily understood, the friction ring 70 is the only one, together with the bearing 30, to exert its effect at low values of torque when, as described hereinabove, the assembly consisting of the parts B and C moves, in practice in the manner of a unit assembly, relative to the part A constituting the hub 10.

On the other hand, the friction rings 72, 75 exert their effects when, the elastic members 33A 33B being opeative, there is relative angular movement between parts B and C.

Figure 9:
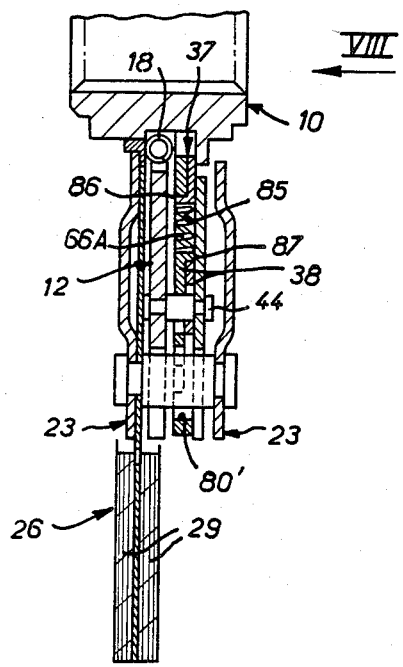
FIG. 9 is a partial view of this alternative embodiment in axial cross-section on the line IX—IX in FIG. 8.
Figure 8:
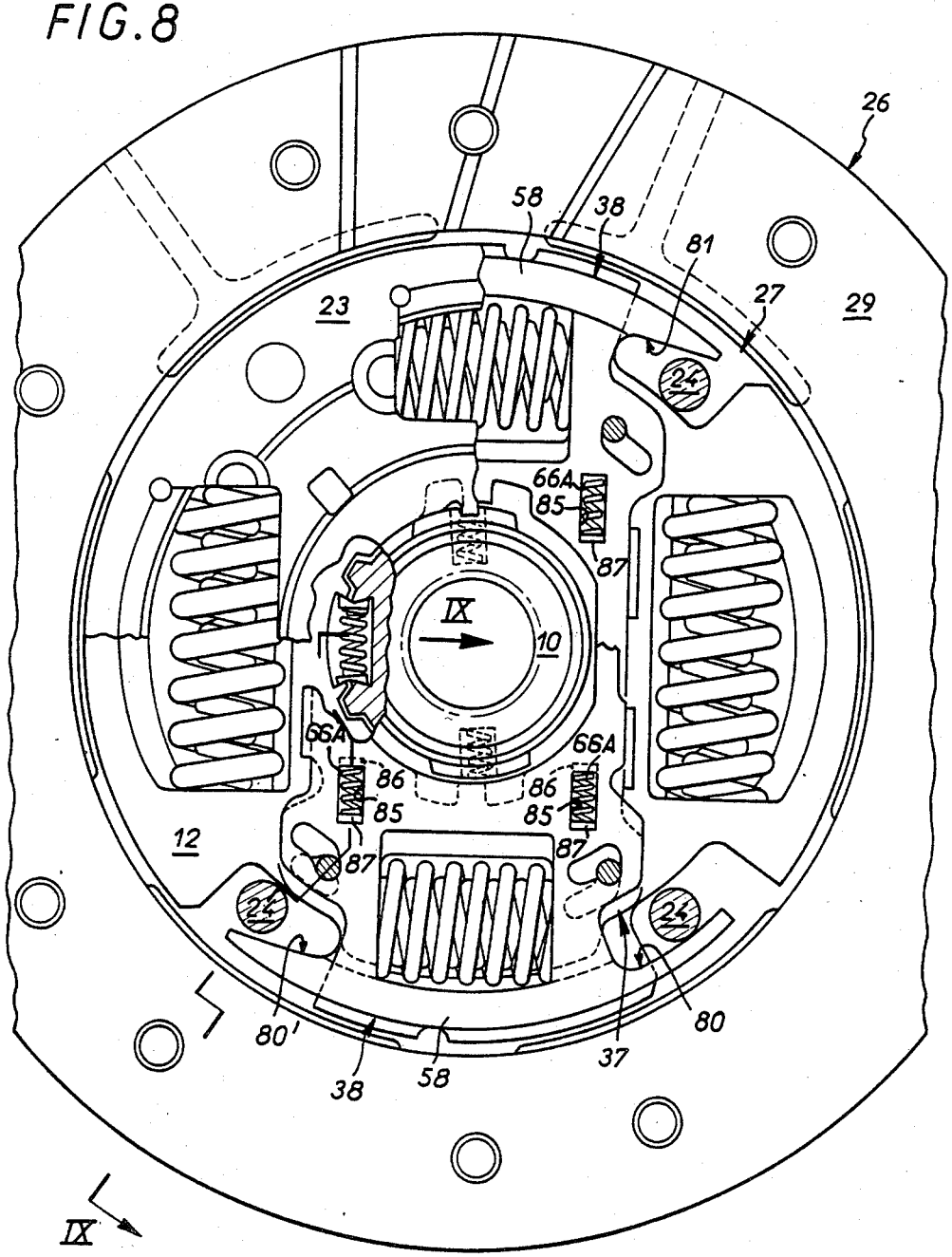
FIG. 8 is a partial view in elevation analogous to that of FIG. 1 and concerns an alternative embodiment.

In the alternative embodiment shown in FIGS. 8 and 9, each of the flanges 38 constituting in accordance with the invention the intermediary member 37 features, on one of its lateral edges, a notch 80 which extends circumferentially and by means of which it is engaged over the nearby peg 24.

In practice each of these flanges 38 features in this way two notches 80, 80' each disposed on a respective one of its two lateral edges.

For one at least of said notches, in this instance the notch 80' circumferentially on the side opposite the cut-out 60, the radially outermost flank 81 is generally oblique to the tangent to the circumference passing through the end of this flank.

This flank 81 is formed by a circumferential extension of the associated flyweight 58.

The purpose of the flank 81 is to prevent jamming of a flange 38 when the clearance JT is taken up.

Because it is oblique relative to the above-defined tangent, the flank 81 is able to cooperate with the peg 24 to facilitate the movement of the corresponding flange from the inoperative position to the operative position.

The peg 24 tends to move towards the diametral plane of the assembly passing through the median area of the flanges 38 of the intermediary member and therefore exerts a bearing force on the flank 81 of which a radial component, due to the oblique disposition of this flank, facilitates radially outward movement of the flange.

Conjointly with this, the notch 80 is provided to balance the assembly.

In this instance the flanks of this notch 80 are parallel to the outside circumferential edge of the flange and of the associated flyweight 58.

In the embodiment shown in FIGS. 8 and 9, the return springs 66A associated with the flanges 38 are four in number and common to both the flanges 38, being disposed in openings 85 formed in the main surface of both of the latter, in an X-shaped disposition comparable to that of the guide pegs 44 carried by the hub flange 12, and each bearing, on the one hand, at a first end, on a lug 86 which, upstanding at right angles from one of the flanges 38, is engaged in the corresponding opening 85 in the other of the latter, and, on the other hand, at the other end, on a lug 87 which, upstanding at right angles on said other flange 38, penetrates like the previously mentioned lug into the corresponding opening 85 of the first of the latter.

In a particularly advantageous embodiment of the invention, as shown in FIGS. 10 through 13, an intermediary member 37 comprises three generally superposed flanges 138, 139 and 140. The so-called mobile flanges 138 and 140 are radially mobile, being one on each side of the radially fixed, so-called intermediate flange 139.

In a manner comparable with the embodiments of the invention previously described, the three flanges 138, 140 and 139 each feature respective slots 43, 43' by means of which they are engaged over guide pegs 44 (FIG. 2) carried by and projecting axially from the hub flange 12 for this purpose.

To the slots 43 in the mobile flanges 138 and 140 similar to the flanges 38 of the intermediary member in the previously described embodiments there correspond slots 43' formed in the flange 139.

The slots 43' comprise only a single curved section 48, extending in a generally circumferential direction and centered on the axis of the assembly. In this way they cooperate with the guide pegs 44 to maintain the radial position of the intermediate flange 139, which is radially fixed.

In the same way as the flanges 138, 140 comprise opening 55 and 55' identical to the openings in the flanges 38, the intermediate flange 139 comprises two diametrically opposed openings 55' which are actually notches.

These openings 55' in the intermediate flange serve to engage the latter over one of the elastic members 33A, in a similar way to the engagement of the openings 55, 55' in the mobile flanges.

In the specific embodiment shown in FIGS. 10 through 13, the cut-outs 60 are preferably rectilinear and start from a median line on each flange perpendicular to the direction of displacement of the mobile flanges.

Cut-outs 60 of this kind are adapted to prevent the flanges 138, 139 and 140 interfering, on relative angular displacement, with the elastic member 33B corresponding to such angular displacement of the intermediate member.

In a similar manner to the previously described embodiment shown in FIGS. 8 and 9, each of the flanges 138, 140 features two notches 80, 80' each disposed on a respective one of its two lateral edges.

The shape and function of these notches 80, 80' are identical to those previously described.

A specific advantage of the embodiment of the invention shown in FIGS. 10 through 13 is that it permits radial displacement of the mobile flanges 138, 140 independently of one another.

In practice, should one of the mobile flanges tend to take up its operative position before the other mobile flange, either because there is less friction or because of a manufacturing variation in the distribution of mass from one flange to another, it tends to prevent the latter moving radially by virtue of the tension which it exerts on the elastic means linking them to one another.

Attaching each of the mobile flanges 138, 140 to the radially fixed intermediate flange 139 by independent elastic means eliminates this disadvantage.

More precisely, the intermediate flange 139 serves as an attachment support for the mobile flanges.

The attachment means formed on the flanges comprise (FIG. 11):

attachment lugs 62, 69, with axially oriented holes passing through them;

elastic means consisting of springs 65 which can hook onto these attachment lugs and link them in pairs;

cut-outs 63, 63' serving as recesses to prevent the springs 65 and the attachment lugs 69 jamming or rubbing on the flanges, which could disturb their radial displacement.

More precisely, the attachment lugs 62, 69 and the cut-outs 63, 63' are disposed on each of the flanges in a rectangular arrangement, at the corners of a square circumscribing the central opening 45.

Each of the mobile flanges 138, 140 comprises an attachment lug 69 whereas the intermediate flange 139 comprises two attachment lugs 62 which are diametrically opposed, in other words placed on a diagonal.

On superposing the three flanges 138, 139, 140 the attachment lugs 69 of the two mobile flanges 138, 140 are disposed on the other diagonal.

In this way the attachment lugs 63 and the attachment lugs 69 are in a quadrature relationship.

Figure 11:
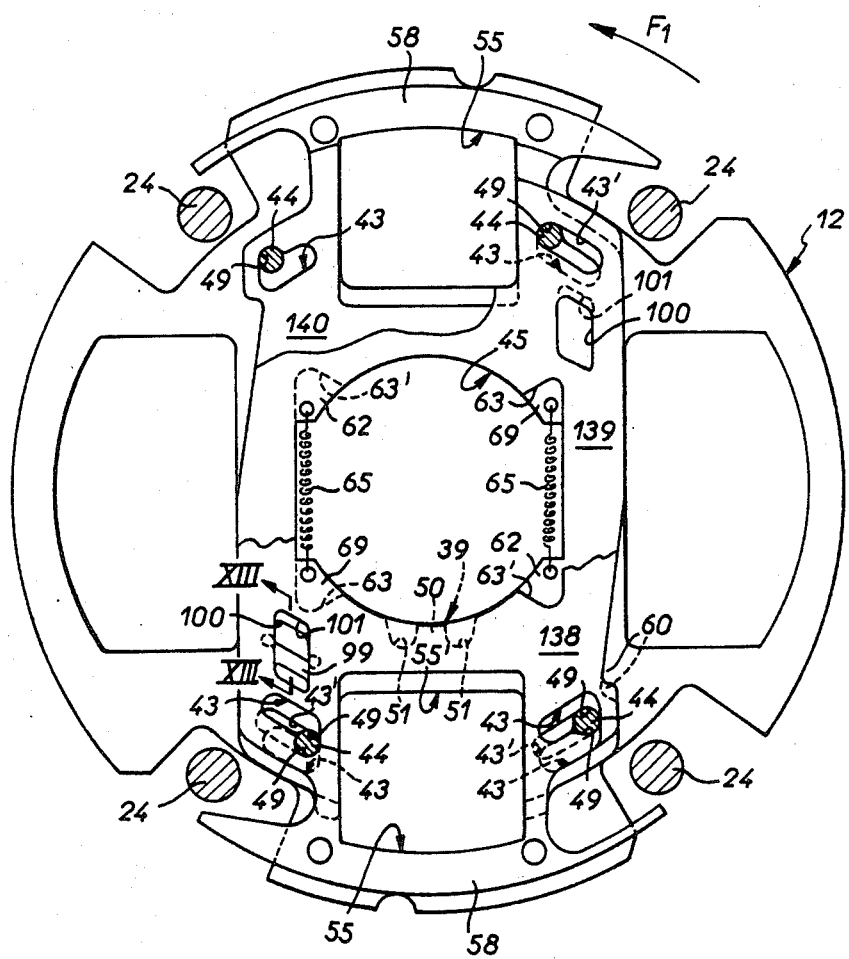
FIG. 11 is a partial view in elevation of the embodiment of the invention shown in FIG. 10.

As can be seen in FIG. 11, the springs 65 each link an attachment lug 69 on a mobile flange 139, 140 to one of the attachment lugs 62 on the intermediate flange 139.

Both these springs 65 are parallel to the diametral plane of the assembly (median plane of the flanges) and thus link together the attachment lugs in a quadrature relationship.

In practice, the springs 65 are attached to the attachment lugs 62, 69 by passing an end loop through perforations with which the attachment lugs are provided to this end.

These loops necessarily project axially beyond the thickness of the attachment lug.

To prevent these loops projecting outside the surface planes of the intermediate member 37 assembly, the attachment lugs 69 on the flanges 138, 140 are bent slightly axially inwards, that is to say towards the flanges which they lie in front of.

To permit free radial movement of the mobile flanges 138, 140 relative to the radially fixed intermediate flange 139, cut-outs 63 and 63' are formed in these flanges to permit this relative movement, on the one hand, and to provide for accommodating the springs 65, on the other hand.

The attachment lugs 69, projecting axially towards the intermediate flange, penetrate into the adjacent cut-out 63 of the latter.

On the side opposite the lug 62, this cut-out 63 is sufficiently recessed to permit movement of the lug 69 which penetrates into it when the corresponding mobile flange moves radially outwards into its so-called operative position.

Likewise, the end loops of the springs 65 passing through the holes in the attachment lugs 62 of the intermediate flange 139 project radially outwards from both sides of the latter.

Straight sections 68 intended to provide the space needed to accommodate the springs 65 are linked to the cut-outs 63, 63' formed in the flanges.

The corner cut-outs 63' in each mobile flange themselves provide the space necessary for accommodating the end loops of the springs 65 and to permit free movement of the lug 69 of the other mobile flange.

Thus the two springs 65, in practice of low stiffness, are disposed in a general direction parallel to the diametral plane of the assembly (median plane of the flanges).

As a result, these springs tend to oppose radially outward movement of the mobile flanges 138, 140 away from one another towards their operative position.

In practice, these so-called return springs 65 do not prevent this separation beyond a certain threshold centrifugal force tending to separate outwardly the mobile flanges, but prevent it below this threshold.

These springs also serve to return the flanges from the operative position to the initial or inoperative position when the centrifugal force decreases.

Each of the mobile flanges 138, 140 comprises, as shown in FIGS. 10, 12 and 13, near one of its four slots 43 and radially inside the latter, a cut-out 95 substantially along three sides of a parallelogram, forming a tab 99.

In the embodiment shown, the tab 99 is substantially disposed on a diagonal defined by a cut-out 63 and an attachment lug 69, at the same end as the latter.

Each cut-out 95 is terminated at each of the two ends of its root portion by a punched area 96 to prevent any possibility of the flange tearing from the corners of the tab 99.

The so-called guide tab 99 formed by the cut-out 95 is bent so as to project axially, lying parallel to the general plane of the flange of which it forms part.

More precisely, a guide tab 99 of this kind projects axially towards the other two flanges, the extent of such projection not exceeding the thickness of the superposed other two flanges, so as not to extend beyond the intermediate member 37.

The intermediate flange 139 comprises two openings 100 adapted to cooperate with the two guide tabs 99 of the mobile flanges 138 and 140, respectively.

These two mobile flanges being disposed head-to-tail and one on either side of the intermediate flange 139, as previously described, the two openings 100 are symmetrically disposed on either side of the diagonal passing through the two cut-outs 63.

As shown in FIG. 13, these openings are sufficiently long, in the direction parallel to the direction of displacement of the mobile flanges between their operative and inoperative positions, to permit such movement.

Movement of the guide tab 99 in the opening 100 is thus made possible in one direction only, which defines its guide function on displacement of the mobile flanges 138, 140.

Each of the mobile flanges 138, 140 is further provided with an opening 101 cooperating with the guide tab 99 projecting axially from the other mobile flange, through the corresponding opening 100. As shown in FIG. 13 in particular, the length of the openings 101 is greater than that of the openings 100 permitting relative movement of the mobile flanges 138, 140 in one direction, thus also contributing to the guidance function, through respective cooperation with the guide tab 99.

The substitution of guide means of this kind for those provided in the previously described embodiments, which is a considerable advantage of the present embodiment, makes it possible to retain a solid surface in the proximity of the bearing lugs 42 which is larger than in the previous embodiments, in which these areas were significantly cut into.

This affects the durability of the flanges and thus that of the intermediary member.

The function of the bearing lugs is to transmit torque between various rotating parts.

The strength of the part of the flanges constituting this bearing lug 42 and the immediately adjacent areas is critical.

For this reason, any weakening of these areas is undesirable.

Any cut-out constitutes a weakness and consequently must be limited to what is strictly necessary, as is achieved in the present embodiment.

It will be noted that in all cases the flanges 138, 139, 140 advantageously constitute, with the hub flange 12 and the counter-flange 46, a subassembly which may be pre-assembled as a unit before its incorporation into the assembly.

It will be understood that various changes in the details, materials and arrangements of parts which have been herein described and illustrated in order to explain the nature of the invention may be made by those skilled in the art within the principle and scope of the invention as expressed in the appended claims.

For example, the intermediate flange 139 could be fixed radially by merely engaging the opening 45, of suitably reduced diameter, over the hub without clearance.

Applications of the present invention are not limited to clutch disks, but extend equally well to torsional damper devices which, comprising no form of friction disk, are employed as vibration filters in continuously variable drive transmission systems.

We claim:

1. Torsional damper device of the kind comprising at least three coaxial rotary parts disposed to rotate relative to one another in pairs within defined limits of relative angular movement against circumferentially acting elastic means operative circumferentially between them over part at least of such relative angular movement, said at least three coaxial parts including a hub, at least one transverse annular hub flange and at least one transverse guide ring, said circumferentially acting elastic means comprising first circumferentially acting elastic means operatively disposed between said hub and said hub flange and second circumferentially acting elastic means operatively disposed between said hub flange and said guide ring, said at leat one transverse annular hub flange being disposed around said hub, meshing means with clearance between said hub and said hub flange, said at least one transverse annular guide ring being parallel to said at least one hub flange and disposed around said hub but independent thereof, an intermediate member responsive to centrifugal force disposed to be movable between an inoperative standby position and, when the rotation speed exceeds a critical value, an operative position in which said intermediate member is operative between two of said rotary parts for at least one direction of relative rotation between said two rotary parts to urge in said at least one direction of relative rotation at least part of said circumferentially acting elastic means operative between one of said two rotary parts and a third one of said rotary parts, and return means urging said intermediate member towards its inoperative standby position, the improvement wherein said intermediate member comprises, for the purpose of its operation between said hub flange and said hub, at least one radially mobile flange guided by said hub flange and having a toothed portion through which, in its operative position, said at least one radially mobile flange cooperates with a complementary toothed portion on said hub and which includes a bearing lug through which said at least one radially mobile flange is operative on at least part of said second circumferentially acting elastic means.

2. Torsional damper device according to claim 1, wherein said at least one radially mobile flange is engaged by means of slots over guide pegs carried by and projecting axially from said hub flange.

3. Torsional damper device according to claim 2, wherein each of said slots in said at least one radially mobile flange comprises two sections, a curved section extending generally circumferentially and centered on the axis of the assembly and a straight section at one circumferential end of the previous section extending substantially parallel to the diametral plane of the assembly passing through the median area of said at least one radially mobile flange.

4. Torsional damper device according to claim 3, wherein said two sections of a slot of said at least one radially mobile flange merge with one another through broadly rounded curves.

5. Torsional damper device according to claim 3, wherein said curved section of each of said slots in said at least one radially mobile flange extends circumferentially from the same end of the associated straight section.

6. Torsional damper device according to claim 2, further comprising, parallel to said hub flange, a counter-flange which is constrained to rotate with said hub flange by said guide pegs carried by the latter and wherein said at least one radially mobile flange extends between said hub flange and said counter-flange.

7. Torsional damper device according to claim 6, wherein said intermediate member comprises two diametral mobile flanges disposed in head-to-tail relationship relative to one another, and further comprising elastic means urging said diametral mobile flanges towards one another in the axial direction.

8. Torsional damper device according to claim 1, wherein the teeth of the complementary toothed portions provided on said at least one radially mobile flange and said hub have flanks slightly oblique to a radius of the assembly passing through their median area and rounded edges.

9. Torsional damper device according to claim 1, wherein said toothed portion on said at least one radially mobile flange is formed by cutting out the edge of an opening by means of which said at least one radially mobile flange is engaged over said hub.

10. Torsional damper device according to clainm 1, wherein said second circumferentially acting elastic means comprise elastic members extending substantially tangentially to a circumference of the assembly and accommodated partly in openings in said hub flange and partly in openings in said at least one guide ring and said at least one radially mobile flange itself comprises at least one opening by means of which it is engaged over one of said elastic members, one edge of said opening constituting the circumferential ends of the latter forming said bearing lug of said at least one radially mobile flange.

11. Torsional damper device according to claim 10, wherein, in the inoperative configuration of the assembly, the other of said edges of said opening in said at least one radially mobile flange is spaced from said elastic member.

12. Torsional damper device according to claim 10, wherein said at least one radially mobile flange extends to either side of the axis of the torsinal damper device and features, one on each side of said axis, two openings by means of which it is engaged over two elastic members.

13. Torsional damper device according to claim 1, wherein said at least one radially mobile flange carries a flyweight.

14. Torsional damper device according to claim 13, wherein said flyweight extends along a circumferential edge of said at least one radially mobile flange on the opposite side of the axis of the torsional damper device relative to said toothed portion.

15. Torsional damper device according to claim 13, wherein said flyweight is formed by folding said at least one radially mobile flange on itself.

16. Torsional damper device according to claim 13, comprising two parallel guide rings fastened together by pegs which extend axially and wherein said at least one radially mobile flange features at least one lateral notch which extends circumferentially and by means of which it is engaged over a peg of this kind and one of the flanks of said notch in said at least one radially mobile flange is formed by a circumferential extension of said flyweight.

17. Torsional damper device according to claim 1, comprising two parallel guide rings fastened together by pegs which extend axially and wherein said at least one mobile flange features at least one lateral notch which extends circumferentially and by means of which it is engaged over a peg of this kind.

18. Torsional damper device according to claim 17, wherein said at least one radially mobile flange has two notches, disposed one on each of its two lateral edges.

19. Torsional damper device according to claim 17, wherein at least one of the flanks of at least one of said notches is generally oblique to a tangent to the circumference of the assembly passing through its median area.

20. Torsional damper device according to claim 1, wherein said intermediary member comprises two diametral mobile flanges disposed in head-to-tail relationship relative to one another.

21. Torsional damper device according to claim 20, wherein said diametral mobile flanges are in contact with one another in the axial direction.

22. Torsional damper device according to claim 20, wherein each of said diametral mobile flanges features along one of its edge portions at least one right-angle lip by which it is axially engaged over the edge of the opposite edge portion of the other diametral mobile flange.

23. Torsional damper device according to claim 1, wherein said intermediate member comprises two diametral mobile flanges disposed in head-to-tail relationship relative to one another, and further comprising elastic means urging said diametral mobile flanges towards one another in the axial direction, and an intermediate flange radially fixed between said diametral mobile flanges.

24. Torsional damper device according to claim 23, further comprising other elastic means coupling each of said diametral mobile flanges to said intermediate flange.

25. Torsional damper device according to claim 24, wherein said other elastic means comprise first elastic means coupling one of said diametral mobile flanges to said intermediate flange and, on the opposite side of said hub thereto, second elastic means coupling the other of said diametral mobile flanges to said intermediate flange.

26. Torsional damper device according to claim 24, wherein said other elastic means are springs disposed substantially parallel to said diametral mobile flanges.

27. Torsional damper device according to claim 23, wherein said diametral mobile flanges are in sliding contact with said intermediate flange, one on each side thereof, the three flanges being superposed.

28. Torsional damper device according to claim 23, further comprising guide means cut into the surface of the flanges for guiding radial displacement of said diametral mobile flanges and preventing any relative angular movement between said diametral mobile flanges and said intermediate flange.

29. Torsional damper device according to claim 28, wherein said guide means comprise guide tabs cut out of said diametral mobile flanges on three sides and bent so as to project axially towards said intermediate flange, said guide tabs being able to slide in openings formed in the other two flanges so as to permit displacement in one direction only parallel to the direction of radial displacement of the diametral mobile flanges of the tabs in the openings and to prevent any relative displacement in any other direction.

30. Torsional damper device according to claim 29, wherein said openings extend radially over a sufficient distance to permit sufficient displacement of said guide tabs for relative radial displacement of said diametral mobile flanges to permit total engagement of said toothed portion of said diametral mobile flanges with said toothed portion of said hub.

* * * * *